March 9, 1937.　　　J. H. McMANUS　　　2,073,315
SEAT
Filed Dec. 4, 1935
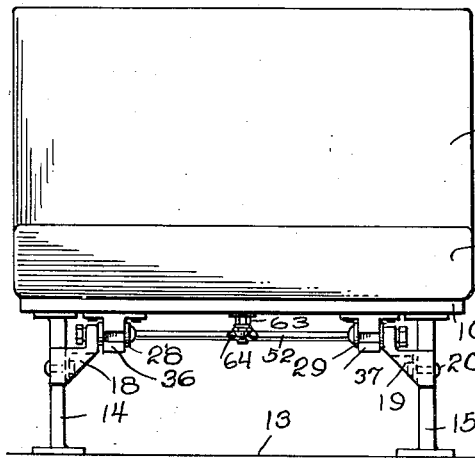
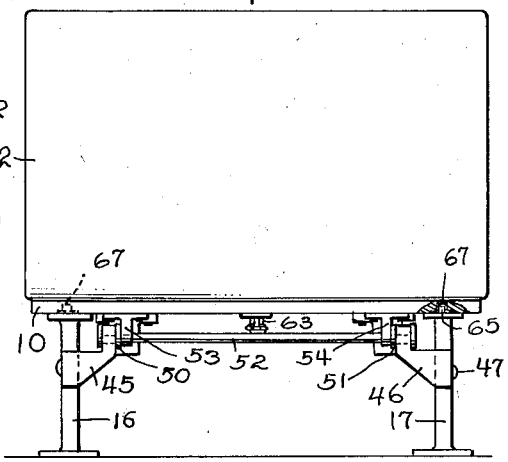
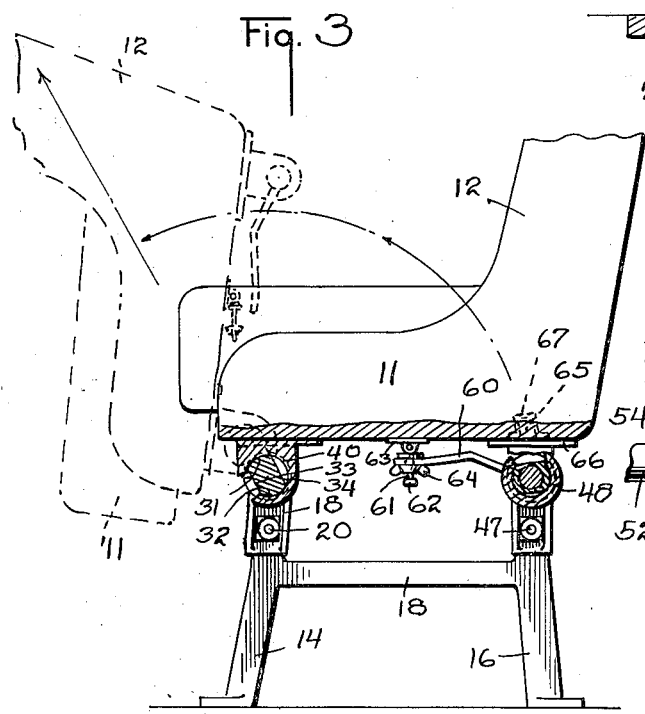
Inventor
James H. McManus
By Blair & Kilcoyne
Attorney Patented Mar. 9, 1937

2,073,315

UNITED STATES PATENT OFFICE 2,073,315

SEAT

James H. McManus, Chelsea, Mass.

Application December 4, 1935, Serial No. 52,891

4 Claims. (Cl. 155—5)

This invention relates to improvements in seats and more particularly to detachable seats for automobile buses and coaches, trains, and like conveyances, although it is to be understood that the seat of the present invention is not limited in this respect and that it has application in and to other fields and uses where a detachable seat has utility.

Heretofore coach and train seats have been securely and more or less permanently bolted to their supporting structures or bases, generally in the nature of pedestals, such secure fastening of the seats resulting in difficulty in the proper cleaning of the conveyance in which the seats are installed. To use the bus industry as an example, the cleaning of a motor bus or coach periodically, as required by the schedule of the transportation company, has been rendered difficult and costly because, unless the seats are removed, thorough cleaning of the coach floor and of the wall portions adjacent the seats is difficult, whereas the cost of removing the seats for cleaning is prohibitive.

Accordingly, among the objects of my invention may be noted the provision of an improved seat for installation in motor buses, coaches, passenger trains, and like conveyances; the provision of a detachable seat for use as aforesaid and of such nature that the seat proper may be readily detached from its supporting structure, thus to permit thorough cleaning of the conveyance as well as of the seat itself and the upholstery thereof; the provision of a detachable seat for a motor bus or coach, and like conveyances, which may be readily attached to its supporting structure; the provision of a seat of the last above described character which may be attached to its supporting structure in such manner as to prevent unintentional and/or unauthorized removal of the seat therefrom; and the provision of seat securing means which is rugged and durable in use, simple in operation, and which is of such nature that it can be applied in place of existing securing means between the seat and its supporting structure and which may, with equal facility, be built into new seat constructions.

Other objects will be in part obvious and in part hereinafter pointed out in connection with the following analysis of this invention, wherein is illustrated one of the various possible embodiments of the present invention, together with certain modifications in detail.

In the drawing—

Fig. 1 is a front view of a coach or bus seat detachably secured to its supporting structure;

Fig. 2 is a rear view of the seat and securing means therefor as illustrated in Fig. 1;

Fig. 3 is a side view, partly in section, illustrating the front and rear coupling means between the seat and its supporting structure, the dotted lines indicating the seat in the position in which it can be removed from the supporting structure;

Fig. 4 is a detail in section through one of the front seat coupling assemblies;

Fig. 5 is a detail in section of one of the rear seat coupling assemblies.

Referring to the drawing, the reference character 10 designates a seat frame which may be rectangular in shape, the frame supporting a seat cushion 11 and a back rest 12. The seat frame 10, and consequently the seat cushion and back rest, is supported in spaced relation from the floor 13 which may be the floor of a motor bus or coach, or of a passenger train, by a supporting structure which in the embodiment illustrated is comprised by a set of front pedestals 14, 15, and a set of rear pedestals 16, 17, the related front and rear pedestals being connected by a brace 18. The pedestals are bolted or otherwise secured to the floor 13 in conventional manner. Inasmuch as the seat generally indicated at 10, 11 and 12 and the supporting structure therefor may vary in accordance with individual design requirements, I do not intend to be limited by the particular seat and supporting structure illustrated and such is regarded by me as suggestive only.

Considering now the coupling means by which the seat at its front portion is coupled to the supporting structure, I may provide the front pedestals 14, 15 with left and right hand brackets 18, 19, respectively, which may be in the form of castings securely bolted to the pedestals as by bolts 20 or may be cast integrally with the front pedestals. The brackets are each provided with an ear 21 (Fig. 4) in which is journaled a headed stub shaft or bolt 22 held to the said ear as by an end nut 23. The said bolts 22 thus provide a mounting for right and left horizontally extending spaced spool-like members 28, 29, hereinafter termed the male coupling members, each of said members being located between the head of its mounting bolt 22 and the inside face of ear 21. The spool-like members are each provided with a squared shoulder 30 engaging in a suitable recess in the related ear 21 of the brackets, thus to prevent relative turning therebetween. Other means for preventing relative turning movement as aforesaid may be substituted. By reference to Fig. 3, the relatively upper and lower surfaces of the spool body portion extend along the arc of a circle as at 31, 32, the side surfaces 33, 34 being plane for the purpose to be described.

Between the end flanges of the spool-like male coupling elements there extend hook or jaw-like portions of the complementary coupling elements 36, 37 which may be termed female or keeper elements. Each of said hook-like portions depends from a head 38 which is suitably secured to the under face of the seat frame 10 as by bolts 39. By reference to Fig. 3, each of the hook-like keeper elements is provided with an inside curved surface 40 to coact with the part-circular surfaces 31, 32 of the male coupling element, there being provided a gap between the ends or lips of the hook which is slightly in excess of the thickness of the male coupling element between the plane surfaces 33, 34 thereof.

The arrangement is such that when the seat frame is disposed in its normal horizontal position as in Figs. 1 and 2, the male and female coupling elements are securely cooperated to couple the front of the seat to the front pedestals, but upon tilting the seat in a counter-clockwise direction (Fig. 3) about the axis of the spools 28, 29, the gap of each female coupling element comes in line with the plane surfaces 33, 34 of the male coupling elements, thus permitting withdrawal of the female coupling elements from coupling relation with the male coupling elements, whereby the seat may be detached from its front supporting pedestals. To couple the front portion of the seat, the operations aforesaid are practiced in reverse order, it being notable that with the aforesaid arrangement, coupling and uncoupling is effected quickly and with the minimum effort as no extraneous manipulations such as the removal of nuts and bolts and their replacement are required.

Upon the occurrence of wear of a male coupling element, such can be readily replaced, as by removing the adjacent end nut 23, whereupon bolt 22 can be moved axially to permit disassembly of a worn spool from the bolt 22 and associated bracket 19 for replacement purposes.

Considering now the coupling means providing securing and hold-down mechanism for the rear portion of the seat, the rear pedestal 16, 17 may be provided with left and right hand brackets 45, 46 as shown in Fig. 2, one such bracket being shown in enlarged section in Fig. 5. Said brackets, like the brackets 18, 19 of the front couplings, may be in the nature of castings bolted as at 47 to the rear pedestals, or they may be formed integral with said pedestals. Each of the brackets is formed with an upwardly extending hook or jaw portion 48, the inner surface of which is part circular, with the lips of the hook opening upwardly to form a mouth for the reception of a complementary coupling member. Two such coupling jaws 48 are provided, one associated with each rear pedestal, such jaws forming, in the case of the rear holding assembly, what may be termed female coupling elements.

Complementary or male coupling elements are carried by the rear portion of the seat, and such preferably comprise spool members 50, 51, generally similar to the spool elements 28, 29, but being mounted for limited rotary movement about the horizontal axis upon which they are arranged.

As will appear, by reference to Fig. 5, a spool member is adapted to be cooperated with each of the female coupling elements, the spool members being carried on a rod 52 which is journaled for rotation in spaced ears 53, 54 secured to the under face of the seat frame 10 and adjacent the rear edge thereof. In order that the coupling spools 50, 51 rotate with the rod 52, the spools are pinned or otherwise secured to the rod as by a pin 55. With the parts in normally coupled relation as shown in Fig. 5, the spool members 50, 51, which form the male elements of the coupling, are received in and held by the jaw members 48, to thus hold down the seat on the rear pedestals 14, 15.

As with the spools 28, 29, the rear spools 50, 51 are provided with plane surfaces and with part-circular surfaces, with the plane surfaces being disposed horizontally, the arrangement being such that when rod 52 is turned in a counter-clockwise direction (Fig. 3) for about 90° the plane faces of the spool members 50, 51 come into line with the lips of the hook or jaw members and disengagement of the rear coupling means may be effected by raising the rear portion of the seat. From the foregoing, it will be understood that the seat during such raising movement of its rear portion can pivot or swing on the axis of the front coupling elements.

One form of means for rotating the rod 52 is illustrated and such may comprise a handle or lever 60 which has one end secured to the rod at about the midportion of the latter, the handle normally extending beneath the seat frame and being thus disposed in out-of-the-way position. The handle is releasably held in such position as by a pivoted holding pin 61 having a head 62 at its free end and being pivoted at its other end to spaced-ear fitting 63 secured to the under face of the seat frame. The free end of the handle is forked whereby the holding pin 61 may be swung into and out of engagement therewith. A wing nut or equivalent device 64 is carried by the holding pin, so that upon cooperation of the handle and pin the wing nut may be screwed upwardly on the pin to secure the handle in its held position. Conversely, when it is desired to operate the handle 60 to effect disengagement of the rear coupling means, wing nut 64 is unscrewed, and the holding pin 61 is swung forward, whereupon the handle 60 may be actuated downwardly to rotate rod 52 and coupling members 50, 51 carried thereby sufficiently so that disengagement of the coupling members may occur. As with the front coupling mechanisms, it is notable that the rear coupling and uncoupling operations are reduced to a minimum and that such operations may be performed in a simple and expeditious manner.

In order that the rear coupling means aforesaid may also function to hold down the rear seat portion on the seat pedestals, as well as to function as a coupling therebetween, I propose to machine the curved bearing surfaces of either the jaws 48 or the spool elements 50, 51, or both, whereby when the lever 60 is moved to effect coupling, there will result a camming operation between the coupling parts which causes the seat to be "brought home" on the rear pedestal. Conversely, actuation of the lever 60 to uncouple the coupling parts will result in a reverse camming action, whereby to make disengagement of the coupling parts more easy to effect.

Means are also provided for properly locating the rear portion of the seat with respect to the pedestals and such may comprise a dowel 65 extending upwardly from a head 66 formed at the top of each of the rear pedestals 16, 17. The dowel fits into a cupped keeper element 67 carried by the under portion of the seat frame 10, and when the dowel is so seated proper relation of the seat frame and the rear pedestals is assured.

From the foregoing description of the invention, it will be evident that a coach or bus seat can be removed bodily from its supporting pedestals by the simple operations of unscrewing the wing nut 64 and swinging the locking pin 61 forward, whereupon handle 60 is swung rearwardly for about 90° and the rear coupling elements then disengaged. The seat can now be swung forwardly for about 90° on the axis of the front coupling elements, with disengagement between the male and female coupling elements being thereupon rendered possible, whereupon the seat is raised bodily from the pedestals. It is notable that it is unnecessary with the above described arrangement to take out any screws or bolts to remove the seat frame, and thus the seat generally, from the supporting pedestals. All of the parts necessary to the above described arrangement may be inexpensively fabricated and installed, and the arrangements are such as to be substantially fool-proof.

Without further analysis the foregoing will so fully reveal the gist of this invention that others can by applying current knowledge readily adapt it for various applications without omitting certain features that, from the standpoint of the prior art, fairly constitute essential characteristics of the generic or specific aspects of the invention, and therefore such adaptations should and are intended to be comprehended within the meaning and range of equivalency of the following claims.

I claim:

1. The combination of a seat, supporting means therefor, front coupling means operative between the seat and the supporting means, rear coupling means operative between the seat and supporting means, the coupling means each comprising complementary rotary and non-rotary coupling elements of which one element is carried by said seat and the other by said supporting means, each rotary element being arranged and constructed for predetermined rotary movement about the axis of its related non-rotary element during which movement the elements are positively coupled, the rotary and non-rotary elements further having provisions which cooperate to effect uncoupling therebetween upon movement of the rotary elements in excess of the predetermined rotary movement aforesaid, and means to rotate the rotary element of one of the coupling means to effect uncoupling thereof from its associated non-rotary element whereby the seat and the seat carried element of the other coupling means may be actuated throughout the predetermined movement aforesaid to a position in which uncoupling of the elements of said other coupling means may be effected.

2. The combination of a seat, supporting means therefor, front coupling means operative between the seat and the supporting means, rear coupling means operative between the seat and supporting means, the coupling means each comprising complementary rotary and non-rotary coupling elements of which one element is carried by said seat and the other by said supporting means, each rotary element being arranged and constructed for predetermined rotary movement about the axis of its related non-rotary element during which movement the elements are positively coupled, the rotary and non-rotary elements further having provisions which cooperate to effect uncoupling therebetween upon movement of the rotary elements in excess of the predetermined rotary movement aforesaid, and means to rotate the rotary element of the rear coupling means to uncoupling relation with respect to its associated non-rotary element, whereby the seat may be tilted forwardly on the axis of the non-rotary element of the front coupling means as aforesaid.

3. The combination of a seat, supporting means therefor, front coupling means operative between the seat and the supporting means, rear coupling means operative between the seat and the supporting means, each means consisting of complementary rotary and non-rotary coupling elements, the rotary element of the front coupling means being carried by the seat and the non-rotary element being carried by the supporting means, the seat and said rotary element having predetermined angular movement about the axis of the non-rotary element, the elements of the front coupling means having provisions to effect uncoupling therebetween upon movement of the seat and said rotary element in excess of the predetermined angular movement aforesaid, the rotary and non-rotary elements of the rear coupling means being carried by the seat and supporting means, respectively, the rotary element of the rear coupling means also having predetermined angular movement about the axis of the non-rotary element thereof, and said elements also having provisions cooperating to effect uncoupling therebetween upon excess angular movement of the rotary element as aforesaid, and means for rotating the rotary element of the rear coupling means whereby to effect uncoupling thereof whereupon the seat may be moved about the axis of the non-rotary element of the front coupling set as aforesaid to a position in which uncoupling may be effected.

4. The combination of a seat, supporting means therefor, front coupling means operative between the seat and supporting means, said coupling means comprising spaced non-rotary elements carried by the supporting means, and complementary rotary elements carried by the seat, the seat and rotary elements being tiltable on the axis of the non-rotary coupling elements throughout a predetermined angular movement, the elements having provisions cooperating to effect uncoupling therebetween upon tilting movement as aforesaid in excess of the predetermined movement, and rear coupling means operative between the seat and the supporting means comprising spaced non-rotary coupling elements carried by the supporting means, complementary rotary elements carried by said seat and operative in one position of rotation to effect uncoupling of the rotary elements from the non-rotary elements, and means common to the rotary elements of the rear coupling means for rotating said rotary elements simultaneously into uncoupling position, whereby to permit tilting of the seat about the axis of the front coupling means as aforesaid.

JAMES H. McMANUS.